(12) United States Patent
Kamigaito et al.

(10) Patent No.: US 8,093,344 B2
(45) Date of Patent: Jan. 10, 2012

(54) β-PINENE POLYMER AND PROCESS FOR PRODUCING THE SAME

(75) Inventors: Masami Kamigaito, Nagoya (JP); Kotaro Satoh, Nagoya (JP); Hiroko Sugiyama, Nagoya (JP)

(73) Assignees: Yasuhara Chemical Co., Ltd., Fuchu (JP); Kuraray Co., Ltd., Kurashi-Shi (JP); National University Corporation Nagoya University, Nagoya-Shi (JP)

( * ) Notice: Subject to any disclaimer, the term of this patent is extended or adjusted under 35 U.S.C. 154(b) by 0 days.

(21) Appl. No.: 12/416,217

(22) Filed: Apr. 1, 2009

(65) Prior Publication Data

US 2009/0209720 A1    Aug. 20, 2009

Related U.S. Application Data

(63) Continuation of application No. PCT/JP2007/069582, filed on Oct. 5, 2007.

(30) Foreign Application Priority Data

Oct. 11, 2006   (JP) ................................ 2006-277391

(51) Int. Cl.
*C08F 210/00* (2006.01)
(52) U.S. Cl. ........................................................ 526/348
(58) Field of Classification Search .................... 526/348
See application file for complete search history.

(56) References Cited

U.S. PATENT DOCUMENTS

| | | | |
|---|---|---|---|
| 3,839,243 A | 10/1974 | Ruckel et al. | |
| 5,395,885 A | 3/1995 | Kennedy et al. | |
| 6,316,560 B1 | 11/2001 | Jacobs et al. | |
| 6,365,686 B1 | 4/2002 | Jacobs et al. | |
| 6,486,264 B1 | 11/2002 | Tsunogae et al. | |
| 2005/0101751 A1* | 5/2005 | Shaffer et al. | 526/242 |
| 2005/0151890 A1 | 7/2005 | Nishimura | |
| 2005/0239963 A1* | 10/2005 | Kitano et al. | 525/88 |

FOREIGN PATENT DOCUMENTS

| | | |
|---|---|---|
| EP | 0 240 762 | 10/1987 |
| JP | 2002-121231 | 4/2002 |
| JP | 2002-121231 A1 | 4/2002 |

OTHER PUBLICATIONS

William J. Roberts and Allan R. Day, "*A Study of the Polymerization of α- and β-Pinene with Friedel-Crafts Type Catalysts*," Journal of the American Chemical Society, 1950, vol. 72, No. 3, pp. 1226-1230.

B. Keszler and J.P. Kennedy, "*Synthesis of High Molecular Weight Poly (β-Pinene)*", Advances in Polymer Science, vol. 100 (1992), pp. 1-9.

Kotaro Satoh, et al., "*Biomass-Derived Heat-Resistant Alicyclic Hydrocarbon Polymers: Poly(terpenes) and Their Hydrogenated Derivatives*," Green Chemistry, 2006, 8, pp. 878-882.

Satoh et al., "Biomass-derived heat-resistant alicyclic hydrocarbon polymers: poly(terpenes) and their hydrogenated derivatives." Green Chem., 2006, 8, pp. 878-882.

* cited by examiner

*Primary Examiner* — Ling Choi
*Assistant Examiner* — Sonya Wright
(74) *Attorney, Agent, or Firm* — Burr & Brown

(57) ABSTRACT

To provide a β-pinene polymer excellent in heat resistance while having thermoplasticity, and further also having excellent strength, without impairing the inherent characteristics of small specific gravity and excellent transparency. A desired β-pinene polymer having a weight average molecular weight of 90,000 to 1,000,000 and a glass transition temperature of 80° C. or more was obtained by polymerizing β-pinene in the presence of a bifunctional vinyl compound.

16 Claims, No Drawings

β-PINENE POLYMER AND PROCESS FOR PRODUCING THE SAME

This application is a continuation of the International Application No. PCT/JP2007/69582, filed Oct. 5, 2007, which claims the benefit under 35 U.S.C. §119(a)-(d) of Japanese Application 2006-277391, filed Oct. 11, 2006, the entireties of which are incorporated herein by reference.

TECHNICAL FIELD

The present invention relates to a β-pinene polymer and a process for producing the same, and more particularly to a β-pinene polymer having high transparency and exhibiting excellent heat resistance when compared to conventional one.

BACKGROUND ART

Hydrocarbon polymers having alicyclic skeletons in their molecules (alicyclic hydrocarbon polymers) have been used as materials for various industrial parts because of their excellent specific inductive capacity, transparency, dimensional stability under heat, solvent resistance and flatness. Such alicyclic hydrocarbon polymers have hitherto been produced by polymerizing or copolymerizing petroleum-derived monomers, or by hydrogenating polymers obtained thereby. For example, patent document 1 (U.S. Pat. No. 6,486,264) proposes a process for producing a hydrogenated ring-opening polymer of a cyclic olefin by conducting ring-opening metathesis polymerization of the cyclic olefin, and then performing hydrogenation. Further, patent document 2 (U.S. Pat. No. 6,365,686: Translation of PCT application) and patent document 3 (U.S. Pat. No. 6,316,560) disclose a cycloolefin copolymer: an alicyclic hydrocarbon polymer, which is obtained by copolymerizing a cyclic olefin and a chain olefin in the presence of a specific catalyst.

Furthermore, the alicyclic hydrocarbon polymers have hitherto been widely used particularly as lenses and various film-shaped or sheet-shaped optical materials because of their amorphousness and high transparency. Specifically, patent document 4 (US 20050151890) shows an optical film composed of a polymer containing an alicyclic structure.

However, although the above-mentioned alicyclic hydrocarbon polymers are small in specific gravity and light in weight as compared to conventional methacrylic resins and carbonate resins, alicyclic hydrocarbon polymers and other polymers lighter in weight have been demanded under the recent circumstances that weight saving has been demanded to various resin formed articles.

On the other hand, for the formation of a recycling-based society, the prevention of global warming and the like, attention has recently been attracted to effective utilization of plant-derived biomass from the viewpoint of carbon neutrality. For example, as one of natural biomass which is abundantly found in the natural world, there are terpenes which are largely contained in pine resin, rind of citrus fruits and the like. Such terpenes have been widely used as raw materials for pharmaceutical compounds and perfumes.

Some terpenes used herein have an alicyclic vinyl monomer structure, and have been known from long ago to have polymerizability. Cationic polymerization of β-pinene which is one of the terpenes is described in non-patent document 1. However, an alicyclic hydrocarbon polymer obtained according to a technique described in non-patent document 1 had a small molecular weight and was insufficient in heat resistance and strength. Accordingly, even the use of such a polymer described in non-patent document 1 could not provide a stable formed article and the like, and it was difficult to use the polymer as a material for the formed article. Therefore, it was only used industrially as a resin additive or a tackifying resin.

Further, non-patent document 2 describes that a polymer having a relatively large molecular weight was obtained by adding 2,6-di-t-butyl-4-methylpyridine in cationic polymerization of β-pinene. However, the glass transition temperature of the polymer obtained therein was 65° C., which was insufficient for practical use.

Patent Document 1: U.S. Pat. No. 6,486,264
Patent Document 2: U.S. Pat. No. 6,365,686
Patent Document 3: U.S. Pat. No. 6,316,560
Patent Document 4: US 20050151890
Non-Patent Document 1: William J. Roberts and Allan R. Day, "A study of the Polymerization of α- and β-Pinene with Friedel-Crafts Type Catalysts", Journal of the American Chemical Society, vol. 72, pp. 1226-1230 (1950), U.S.A.
Non-Patent Document 2: B. Keszler, J. P. Kennedy, "Synthesis of High Molecular Weight Poly (β-Pinene)", Advances in Polymer Science, vol. 100, pp. 1-9 (1992), Germany

SUMMARY OF THE INVENTION

The present invention has been made in the light of the situation described above. It is therefore an object of the present invention to provide a β-pinene polymer excellent in heat resistance as compared to conventional one while having thermoplasticity, and further also excellent in strength without impairing the inherent characteristics of small specific gravity and excellent transparency.

The inventors of the present invention have conducted intensive study and research in an effort to solve the above-mentioned problems. The inventors have found that a β-pinene polymer obtained according to a specified process can advantageously solve the above-mentioned problems, thereby attaining the invention.

Specifically, a first aspect of the present invention is a β-pinene polymer having a weight average molecular weight of 90,000 to 1,000,000 and a glass transition temperature of 80° C. or more.

Further, in a second aspect of such a β-pinene polymer according to the present invention, the β-pinene polymer is one obtained by polymerizing β-pinene in the presence of a bifunctional vinyl compound.

Furthermore, in a third aspect of the present invention, the β-pinene polymer is one obtained by cationically polymerizing β-pinene using a living cationic polymerization catalyst comprising a combination of an initiator and a Lewis acid.

In addition, in a fourth aspect of the present invention, the β-pinene polymer is one obtained by copolymerizing the group of monomers consisting of β-pinene and any one of a cationically polymerizable monomer, a radically polymerizable monomer and a coordination polymerizable monomer in the presence of a bifunctional vinyl compound.

Further, in a fifth aspect of the present invention, the β-pinene polymer is one obtained by cationically copolymerizing the group of monomers consisting of the β-pinene and a cationically polymerizable monomer using a living cationic polymerization catalyst comprising a combination of an initiator and a Lewis acid.

Furthermore, in a sixth aspect of the present invention, the group of monomers in the above-mentioned fourth and fifth aspects includes β-pinene in a proportion of 50% by weight or more.

Moreover, in a seventh aspect of the present invention, the β-pinene polymer of each of the above-mentioned aspects is one in which olefinic carbon-carbon double bonds in the polymer are at least partially hydrogenated.

In addition, in a eighth aspect of the β-pinene polymer according to the present invention, the ratio (A/B) of an integral value A of a signal detected at δ=4.0 to 6.0 ppm to an integral value B of a signal detected at δ=0.5 to 2.5 ppm, in a $^{1}$H-NMR spectrum which is measured using a deuterated chloroform solvent and in which the protons of tetramethylsilane are taken as 0 ppm, is from 0 to 0.003.

Further, in a ninth aspect of the β-pinene polymer according to the present invention, the specific gravity is less than 1.0, and the 10% weight loss temperature is 400° C. or more.

Meanwhile, a tenth aspect of the present invention is a formed article comprising the β-pinene polymer of each of the above-mentioned aspects, the formed article having a total light transmittance of 90% or more and a 10% weight loss temperature of 400° C. or more.

Further, an eleventh aspect of the present invention is a process for producing a β-pinene polymer which comprises the step of cationically polymerizing β-pinene or cationically copolymerizing the group of monomers consisting of β-pinene and a cationically polymerizable monomer using a Lewis acid catalyst in the presence of a bifunctional vinyl compound.

Furthermore, a twelfth aspect of the present invention is a process for producing a β-pinene polymer which comprises the step of cationically polymerizing β-pinene or cationically copolymerizing the group of monomers consisting of β-pinene and a cationically polymerizable monomer using a living cationic polymerization catalyst comprising a combination of an initiator and a Lewis acid.

In addition, in a thirteenth aspect of the present invention, after the cationic polymerization or cationic copolymerization in each of the above-mentioned eleventh and twelfth aspects, olefinic carbon-carbon double bonds in the obtained polymer are hydrogenated.

As described above, the β-pinene polymer according to the present invention has a large weight average molecular weight as compared to conventional one, so that it is excellent in heat resistance and strength while maintaining the inherent characteristics (small specific gravity and excellent transparency) of the β-pinene polymer.

DETAILED DESCRIPTION OF THE INVENTION

An example of embodiments of the present invention will be described below. In the following description, some specific examples are shown as compounds exhibiting specific functions. However, it is to be understood that the present invention is not limited to these compounds. Further, the exemplified compounds can be used not only alone, but also in combination of two or more thereof, unless otherwise described. Furthermore, the β-pinene polymers in this specification and claims include not only a β-pinene homopolymer obtained by polymerizing β-pinene alone, but also a β-pinene copolymer obtained by copolymerizing β-pinene with at least one different monomer.

When the β-pinene polymer according to the present invention is produced, β-pinene is first prepared. As such β-pinene, there can be used any one which has hitherto been known. For example, one extracted from plants is directly used after purification and it is also possible to use β-pinene produced using a terpene such as α-pinene extracted from plants or a petroleum-derived compound, according to a technique which has hitherto been known (for example, a technique disclosed in U.S. Pat. No. 3,278,623).

Further, the β-pinene polymer of the present invention is obtained, of course, by homopolymerizing β-pinene described above, and can also be advantageously obtained by copolymerizing the group of monomers consisting of such β-pinene and a cationically polymerizable monomer, a radically polymerizable monomer or a coordination polymerizable monomer. As the group of monomers used herein, there is advantageously used one containing β-pinene in a proportion of at least 50% by weight, preferably in a proportion of at least 70% by weight, for producing the β-pinene polymer of the present invention. When the proportion of the β-pinene is less than 50% by weight, the content of the petroleum-derived monomer inevitably increases to cause a risk of failing to advantageously achieve low pollution and low environmental burden.

As the cationically polymerizable monomer, the radically polymerizable monomer and the coordination polymerizable monomer used in producing the β-pinene polymer of the present invention, it is possible to use ones which have hitherto been generally used. Further, it is also possible to use a plant-derived terpene as the polymerizable monomer in any one of a cationic polymerization process, a radical polymerization process and a coordination polymerization process. Specifically, examples of the cationically polymerizable monomers include isobutylene, isoprene, butadiene, styrene, α-methylstyrene, p-methylstyrene, p-methoxystyrene, p-t-butoxystyrene, indene, an alkyl vinyl ether, norbornene and the like, and examples of the radically polymerizable monomers include (meth)acrylates such as methyl(meth)acrylate, ethyl(meth)acrylate, n-butyl(meth)acrylate, 2-ethylhexyl(meth)acrylate, 2-hydroxyethyl(meth)acrylate, 2-hydroxypropyl(meth)acrylate and glycidyl(meth)acrylate; nitrile group-containing vinyl monomers such as acrylonitrile and methacrylonitrile; amido group-containing vinyl monomers such as acrylamide and methacrylamide; vinyl esters such as vinyl acetate, vinyl pivalate and vinyl benzoate; vinyl chloride, vinylidene chloride, maleic anhydride, maleic acid, fumaric acid, fumarate, maleimide and the like. Further, as the coordination polymerizable monomers, there can be exemplified ethylene, propylene, 1-hexene, cyclopentene, norbornene and the like. Furthermore, as the plant-derived terpenes, there can be exemplified myrcene, alloocimene, ocimene, α-pinene, dipentene, limonene, α-phellandrene, α-terpinene, γ-terpinene, 2-carene, 3-carene and the like. From these, one or two or more are appropriately selected and used depending on the amount of β-pinene used and the like. In the present invention, the desired polymer is advantageously obtained by the cationic polymerization process, so that the cationically polymerizable monomer is advantageously used.

The β-pinene polymer according to the present invention is obtained by polymerizing β-pinene described above or copolymerizing the group of monomers consisting of such β-pinene and the cationically polymerizable monomer, the radically polymerizable monomer, the coordination polymerizable monomer or the plant-derived terpene. In one process used herein when β-pinene is polymerized or the group of monomers containing β-pinene is copolymerized, a bifunctional vinyl compound is added in an amount sufficiently smaller than that of β-pinene or the group of monomers. The bifunctional vinyl compound is generally used as a branching agent or a crosslinking agent in producing a polymer, and the β-pinene polymer of the present invention having a so-called long-chain branched structure and having a molecular weight generating no insoluble portion in an organic solvent is advantageously obtained by using it in small amounts. Accordingly, an amount of such a bifunctional vinyl compound is appropriately determined so that the resulting polymer has the molecular weight generating no insoluble portion in an organic solvent. In general, it is added in such a quantitative proportion as to give 0.1 to 5.0 parts by weight and preferably 1.0 to 4.0 parts by weight, based on 100 parts by weight of the total amount of the monomer(s). When the amount of the bifunctional vinyl compound added is too small, the addition effect thereof is not observed. On the other hand, when it is too much, the crosslinking reaction proceeds excessively, and the resulting β-pinene polymer becomes a gel state to lose thermoplasticity, which causes a risk of failing to achieve the object of the present invention.

In the present invention, one having two vinyl groups in its molecule can be used as such a bifunctional vinyl compound without any particular limitation. Specific examples thereof include m-diisopropenylbenzene, p-diisopropenylbenzene, m-divinylbenzene, p-divinylbenzene, 1,4-cyclohexanedimethanol divinyl ether, ethylene glycol divinyl ether and the like. In particular, m-diisopropenylbenzene is advantageously used from the viewpoints of economy, reactivity and the like.

When β-pinene is used alone in producing the β-pinene polymer of the present invention, polymerization thereof proceeds by any of cationic polymerization, radical polymerization and coordination polymerization. However, when the group of monomers consisting of β-pinene and another monomer is used, copolymerization of such a group of monomers proceeds by any of cationic copolymerization, radical copolymerization and coordination polymerization, depending on the kind of monomer. In the present invention, the desired polymer can be advantageously obtained by cationically polymerizing β-pinene, or cationically copolymerizing the group of monomers consisting of β-pinene and the cationically polymerizable monomer. The production of the β-pinene polymer of the present invention by cationic polymerization or cationic copolymerization will be described in detail below.

When the β-pinene polymer according to the present invention is produced, as a form of cationically polymerizing β-pinene or cationically copolymerizing the group of monomers consisting of β-pinene and the cationically polymerizable monomer, there can be employed all of various polymerization processes which have hitherto been known, such as a bulk polymerization process, a solution polymerization process and a dispersion polymerization process.

Further, as a Lewis acid catalyst used in the case of cationic polymerization or cationic copolymerization, one which has hitherto been known can also be used without any limitation. Examples of the Lewis acid catalysts include metal halides such as $BF_3$, $BBr_3$, $AlF_3$, $AlCl_3$, $AlBr_3$, $TiCl_4$, $TiBr_4$, $TiI_4$, $FeCl_3$, $FeCl_2$, $SnCl_2$, $SnCl_4$, $WCl_6$, $MoCl_5$, $SbCl_5$, $TeCl_2$ and $ZnCl_2$; metal alkyl compounds such as $Et_3Al$, $Et_2AlCl$, $EtAlCl_2$, $Et_3Al_2Cl_3$, $(i\text{-}Bu)_3Al$, $(i\text{-}Bu)_2AlCl$, $(i\text{-}Bu)AlCl_2$, $Me_4Sn$, $Et_4Sn$, $Bu_4Sn$ and $Bu_3SnCl$; and metal alkoxy compounds such as $Al(OR)_{3-x}Cl_x$ and $Ti(OR)_{4-y}Cl_y$ (in which R represents an alkyl group or an aryl group, x represents an integer of 1 or 2, and y represents an integer of 1 to 3). In particular, $AlCl_3$, $Et_2AlCl$, $EtAlCl_2$, $Et_3Al_2Cl_3$, $BCl_3$, $SnCl_4$, $TiCl_4$ and $Ti(OR)_{4-y}Cl_y$ are advantageously used in terms of high reactivity and good selectivity.

The Lewis acid catalyst is added in such a quantitative proportion as to give 0.001 to 100 parts by weight, preferably 0.005 to 50 parts by weight and more preferably 0.01 to 10 parts by weight, based on 100 parts by weight of the total amount of the monomer(s). When the amount of such a Lewis acid catalyst added is too small, there is a risk that the reaction terminates before completion of the polymerization. On the contrary, too much is uneconomical.

As described above, in one process for producing the β-pinene polymer according to the present invention, the bifunctional vinyl compound is added when β-pinene is polymerized or the group of monomers consisting of β-pinene and the cationically polymerizable monomer is copolymerized. However, in another process, the β-pinene polymer according to the present invention can also be advantageously obtained by conducting cationic polymerization using a living cationic polymerization catalyst comprising a combination of an initiator and a Lewis acid, without using such a bifunctional vinyl compound. When β-pinene and the like are polymerized or copolymerized using such a living cationic polymerization catalyst, it is possible to advantageously inhibit a side reaction such as a chain transfer reaction or a proton-initiated reaction. As a technique of the living cationic polymerization, there is employed a technique described in J. P. Kennedy et al., "Carbocationic Polymerization", John Wiley & Sons, 1982; K. Matyjaszewski et al., "Cationic Polymerizations", Marcel Dekker, 1996; or the like.

As the Lewis acids used here in the living cationic polymerization catalyst, the above-mentioned ones which have hitherto been known can be used without any limitation. Further, the initiator used in combination with such a Lewis acid is one which reacts with the Lewis acid to generate a carbon cation, and can be used without any limitation, as long as it has such a characteristic. Specific examples thereof include chlorine-based initiators such as an alkyl vinyl ether-hydrogen chloride adduct, α-chloroethylbenzene, α-chloroisopropylbenzene (hereinafter also referred to as cumyl chloride), 1,4-bis(α-chloroisopropyl)benzene (hereinafter also referred to as p-DCC or p-dicumyl chloride), 1,3-bis(α-chloroisopropyl)benzene (hereinafter also referred to as m-DCC or m-dicumyl chloride), 1,3-bis(α-chloroisopropyl)-5-t-butylbenzene, 1,3,5-tris(α-chloroisopropyl)benzene, t-butyl chloride and 2-chloro-2,4,4-trimethyl-pentane; ester-based initiators such as an alkyl vinyl ether-acetic acid adduct, α-acetoxyethylbenzene, α-acetoxyisopropylbenzene, 1,4-bis(α-acetoxyisopropyl)benzene and 1,3-bis(α-acetoxyisopropyl)benzene; alcohol-based initiators such as α-hydroxyethylbenzene, α-hydroxyisopropylbenzene, 1,4-bis(α-hydroxyisopropyl)benzene and 1,3-bis(α-hydroxyisopropyl)benzene; and the like. These can be used either alone or as a mixture thereof. In particular, the chlorine-based initiators such as cumyl chloride, p-DCC and m-DCC are advantageously used in terms of high reactivity and good selectivity.

Further, the above-mentioned initiator is used in such a quantitative proportion as to give 0.001 to 1.0 part by weight and preferably 0.01 to 0.5 part by weight, based on 100 parts by weight of β-pinene or the group of monomers used, because the desired molecular weight of the polymer can be set depending on the feed molar ratio to β-pinene or the group of monomers. When the amount of the initiator is small, the effect of the initiator is not sufficiently exhibited. On the contrary, too much leads to a decrease in molecular weight.

Furthermore, in order to obtain the good β-pinene polymer, an electron donor is advantageously used together with the living cationic polymerization catalyst. The use of the electron donor allows more advantageous inhibition of a side reaction. As such an electron donor, one which has hitherto been known can also be used without any limitation. Specific examples thereof include ethers such as diethyl ether ($Et_2O$), methyl t-butyl ether and dibutyl ether; esters such as ethyl acetate (EtOAc), methyl acetate, isopropyl acetate, butyl acetate, methyl isobutyrate, ethyl isobutyrate and propyl isobutyrate; pyridines such as pyridine, 2-methylpyridine, 2,6-dimethylpyridine, 2,6-di-t-butylpyridine, 2,6-diphenylpyridine and 2,6-di-t-butyl-4-methylpyridine; amines such as trimethylamine, triethylamine and tributylamine; amides such as dimethylacetamide and diethylacetamide; sulfoxides such as dimethyl sulfoxide; and the like. In particular, diethyl ether, ethyl acetate and the like are suitably used because of its economy and easy removability after the reaction.

When β-pinene is cationically polymerized or the group of monomers consisting of β-pinene and the cationically polymerizable monomer is cationically copolymerized according to the solution polymerization process, the preparation is performed so that the concentration of β-pinene or the group of monomers becomes 1 to 90% by weight, preferably 10 to 80% by weight and more preferably 10 to 50% by weight, based on the total amount of a polymerization system. When such a concentration is less than 1% by weight, productivity becomes low. On the other hand, when it exceeds 90% by weight, removal of polymerization heat becomes difficult.

Further, a solvent which is used when the cationic polymerization or cationic copolymerization is conducted by the solution polymerization process is not particularly limited, as long as it is a solvent in which β-pinene or the group of monomers consisting of β-pinene and the cationically polymerizable monomer is soluble and in which little chain transfer occurs. From the viewpoints of solubility, reactivity and the like under polymerization conditions of the polymer, the solvent is selected from any of halogenated hydrocarbons, aromatic hydrocarbons, aliphatic hydrocarbons and the like, and it is possible to use a single solvent or a mixed solvent in which two or more solvents are mixed. Specific examples thereof include halogenated hydrocarbon-based solvents such as methylene chloride, chloroform, 1,1-dichloroethane, 1,2-dichloroethane, n-propyl chloride, 1-chloro-n-butane and 2-chloro-n-butane; aromatic hydrocarbon-based solvents such as benzene, toluene, xylene and anisole; aliphatic hydrocarbon-based solvents such as pentane, hexane, heptane, octane, cyclopentane, cyclohexane, methylcyclohexane, ethylcyclohexane and decalin; and the like. A single solvent selected therefrom or a mixed solvent in which two or more thereof are mixed is advantageously used.

Furthermore, the reaction temperature at the time when the cationic polymerization or cationic copolymerization is conducted according to the solution polymerization process is set to usually −120° C. to 100° C., preferably −100° C. to 50° C. and more preferably −80° C. to 0° C. Too high a reaction temperature results in the difficulty of controlling the reaction, which causes a risk of failing to obtain reproducibility, whereas too low results in economical inefficiency.

Moreover, not only when the cationic polymerization and cationic copolymerization described above are conducted, but also when radical polymerization and radical copolymerization, and further coordination polymerization and coordination copolymerization are conducted, the reaction time is not particularly limited, and appropriately determined so that the β-pinene polymer having desired characteristics is obtained, depending on conditions such as the kind of polymerization, the kind and amount of polymerization catalyst, the reaction temperature and the reaction equipment. It is usually from about 1 second to about 100 hours, preferably from about 30 seconds to about 20 hours, and more preferably from about 1 minute to about 5 hours.

Then, after β-pinene has been polymerized or the group of monomers consisting of β-pinene and the cationically polymerizable monomer has been copolymerized, the polymer can be obtained by separation from a reaction mixture according to an usual operation used in isolating a polymer from a solution, such as reprecipitation, removal of solvent under heating, removal of solvent under reduced pressure, removal of solvent by water vapor (coagulation) or removal of solvent by deaeration with an extruder.

The molecular weight of the β-pinene polymer thus obtained is preferably from 90,000 to 1,000,000, more preferably from 90,000 to 500,000, and still more preferably from 90,000 to 250,000, in weight average molecular weight, in terms of viscosity of a polymerization solution, melt viscosity, formability, strength of a formed article and heat resistance. When the molecular weight of the polymer is too high, the viscosity of the polymerization solution increases to deteriorate productivity of the polymer, and the melt viscosity of the polymer increases to cause a risk of deteriorating formability. On the other hand, when the molecular weight is too low, the strength of the formed article obtained using the polymer decreases, and the glass transition temperature thereof becomes less than 80° C., which causes insufficient heat resistance.

Further, the glass transition temperature of the β-pinene polymer is preferably from 80° C. to 350° C., more preferably from 85° C. to 250° C., and still more preferably from 90° C. to 200° C., in terms of heat resistance, formability, strength of a formed article and heat resistance. Too high a glass transition temperature results in a decrease in the melt viscosity of the polymer to deteriorate formability, whereas too low a glass transition temperature results in a decrease in the operating temperature limit of the formed article, which is impractical.

In the present description and claims, the weight average molecular weight of the β-pinene polymer is determined according to a technique of size exclusion chromatography defined by JIS-K-0124-2002 "General Rule of High Performance Liquid Chromatography", and determined from a value of a differential refractometer measured by gel permeation chromatography (GPC) and a calibration curve of standard polystyrene. Further, the glass transition temperature is determined according to a technique defined by JIS-K-7121-1987 "Method for Measuring Transition Temperature of Plastics", and the intermediate point glass transition temperature ($T_{mg}$) therein means the glass transition temperature in the present specification and claims.

By the way, it is effective to perform hydrogenation to the resulting 1-pinene polymer, that is to say, to hydrogenate olefinic carbon-carbon double bonds existing in the inside of the polymer. Further, to the polymer obtained by copolymerizing β-pinene and the cationically polymerizable monomer, the radically polymerizable monomer or the coordination polymerizable monomer that contain aromatic ring, it is also effective to hydrogenate aromatic double bonds existing in the inside thereof. By such hydrogenation, the β-pinene polymer exhibiting more excellent heat resistance and the like is obtained.

Here, the hydrogenation to the β-pinene polymer of the present invention can be performed according to various techniques which have hitherto been known. Further, also as a catalyst (hydrogenation catalyst) used in the hydrogenation, any one can be used, as long as it is one generally used in a hydrogenation reaction of olefins or aromatic compounds. Examples thereof include (1) a supported metal catalyst in which a transition metal such as palladium, platinum, nickel, rhodium or ruthenium is supported on a carrier such as carbon, alumina, silica or diatomaceous earth; (2) a homogeneous system catalyst comprising an organic transition metal compound of titanium, cobalt, nickel or the like and an organic metal compound of lithium, magnesium, aluminum, tin or the like; further, (3) a metal complex catalyst of rhodium, ruthenium or the like.

Specifically, examples of the supported metal catalysts of the above (1) include catalysts such as nickel/silica, nickel/diatomaceous earth, nickel/alumina, palladium/carbon, palladium/silica, palladium/diatomaceous earth, palladium/alumina, platinum/silica, platinum/alumina, rhodium/silica, rhodium/alumina, ruthenium/silica and ruthenium/alumina. Further, examples of the homogeneous system catalysts of the above (2) include combinations such as cobalt acetate/triethylaluminum, nickel trioctylate/triisobutylaluminum, nickel acetylacetonate/triisobutylaluminum, titanocene dichloride/n-butyllithium, zirconocene dichloride/sec-butyllithium and tetrabutoxy titanate/dimethylmagnesium. Furthermore, the metal complex catalysts of the above (3) include chlorotris(triphenylphosphine)rhodium, dihydridotetra(triphenylphosphine)ruthenium, hydrido(acetonitrile)tris(triphenylphosphine)ruthenium, carbonylchlorohydridotris(triphenylphosphine)ruthenium, carbonyldihydridotris(triphenylphosphine)ruthenium and the like. Of these hydrogenation catalysts, the supported metal catalyst of (1) is particularly advantageously used, because, when the hydrogenation catalyst is separated and recovered by filtration after the hydrogenation reaction, there is the advantage of being able to separate and recover the polymerization catalyst together.

Further, the reaction temperature at the time when the hydrogenation is performed is set usually within the range of −20 to 250° C., preferably −10 to 220° C. and more preferably 0 to 200° C., and the hydrogenation is performed under a hydrogen pressure of usually 0.1 to 100 kg/cm$^2$, preferably 0.5 to 70 kg/cm$^2$ and more preferably 1 to 50 kg/cm$^2$. Too low a hydrogenation pressure results in a decrease in the degree of hydrogenation, whereas too high a pressure requires a high-pressure reactor. Further, the reaction temperature is set to such a temperature that the polymer is not thermally decomposed, and the reaction is conducted usually at 300° C. or less and preferably at 250° C. or less. However, too low a reaction temperature results in a decrease in the rate of reaction, which causes a risk of failing to complete the reaction.

Furthermore, a solvent for the hydrogenation is not particularly limited, as long as it is an organic solvent which dissolves the polymer and is catalytically inactive. From solubility and reactivity of a hydrogenated product of the polymer, it is possible to use a single or mixed solvent selected from any of aliphatic hydrocarbons, halogenated hydrocarbons, aromatic hydrocarbons and the like. Specific examples thereof include aromatic hydrocarbon-based solvents such as benzene and toluene; aliphatic hydrocarbon-based solvents such as n-pentane, n-hexane, n-heptane, n-octane, cyclopentane, cyclohexane, methylcyclohexane, ethylcyclohexane and decalin; ether-based solvents such as tetrahydrofuran and ethylene glycol dimethyl ether; and halogenated hydrocarbon-based solvents such as methylene chloride, chloroform, 1,1-dichloroethane, 1,2-dichloroethane, n-propyl chloride, 1-chloro-n-butane and 2-chloro-n-butane. One or two or more thereof are advantageously used. Of these, the hydrocarbon-based solvents are particularly preferred in terms of solubility and reactivity. The organic solvent may be the same as the solvent used in the polymerization reaction, and it is also possible to add the hydrogenation catalyst to the polymerization reaction solution so as to conduct the reaction (hydrogenation).

Further, the required reaction time for the hydrogenation is usually from 0.1 to 10 hours, and it is desirable to add hydrogen until 70% or more of unsaturated double bonds (carbon-carbon double bonds) in the polymer before the hydrogenation are saturated. It is desirable to continue the hydrogenation until preferably 90% or more, more preferably 95% or more are saturated. The alicyclic hydrocarbon-based polymer excellent in weather resistance is advantageously obtained thereby. The degree of hydrogenation of unsaturated double bonds (carbon-carbon double bonds) in a hydrogenated polymer can be generally calculated by an analytical procedure such as an iodometric titration method, infrared spectroscopic measurement or nuclear magnetic resonance spectrum ($^1$H-NMR spectrum) measurement.

In the present description and claims, the degree of hydrogenation to olefinic double bonds of the β-pinene polymer is evaluated by values calculated by the nuclear magnetic resonance spectrum ($^1$H-NMR spectrum) measurement using deuterated chloroform as a solvent. Specifically, in the $^1$H-NMR spectrum which is measured using deuterated chloroform as the solvent and in which the protons of tetramethylsilane are taken as 0 ppm, a value A as an integral value of a signal detected at δ=4.0 to 6.0 ppm, that is to say, an integral value of a signal derived from the protons of the olefinic double bond and a value B as a signal detected at δ=0.5 to 2.5 ppm, that is to say, an integral value of a signal derived from the protons of the saturated hydrocarbon are calculated, and evaluation is made by the ratio (A/B) thereof. Such a ratio (A/B) decreases as the degree of hydrogenation increases. In the β-pinene polymer of the present invention, the ratio is preferably from 0 to 0.003, and more preferably from 0 to 0.0003.

Further, according to the above-mentioned process, it is possible to produce the β-pinene polymer having a specific gravity of less than 1.0 and a 10% weight loss temperature of 400° C. or more. In the present specification and claims, the term "specific gravity" means one measured in accordance with method A in JIS-K-7112-1999. Further, the term "10% weight loss temperature" means a temperature at which the mass loss rate defined in JIS-K-7120-1987 "Thermal Weight Measurement of Plastics" has reached 10%. Specifically, the temperature of a sample (β-pinene polymer) sufficiently dried to remove the solvent is elevated from 25° C. to 500° C. at a heating rate of 10° C./min under a nitrogen stream of 100 mL/min, and a thermal weight loss in the elevation of temperature is measured. The 10% weight loss temperature means a temperature at which the weight has decreased by 10% from the initial weight.

By the way, the β-pinene polymer according to the present invention has no branched structure when no bifunctional vinyl compound is used. Even when the bifunctional vinyl compound is used, it does not have an intricately crosslinked network structure and has a long-chain branched structure, because the amount thereof used is small. It has therefore plasticity. Accordingly, molding process such as press molding, extrusion molding or injection molding is possible. When the formed article is produced by using the aliphatic hydrocarbon-based polymer of the present invention, ingredients such as various additives such as a stabilizer, a lubricant, a pigment, an impact resistance improver, a processing aid, a reinforcing agent, a coloring agent, a flame retardant, a weather resistance improver, an ultraviolet absorber, an antioxidant, a fungicide, an antibacterial agent, a light stabilizer, an antistatic agent, silicone oil, an antiblocking agent, a release agent, a foaming agent and a perfume; various fibers such as glass fibers and polyester fibers; fillers such as talc, mica, montmorillonite, silica and wood powder; and various coupling agents can be incorporated therein at the time of forming as needed.

By forming the β-pinene polymer of the present invention, it is possible to obtain the formed article excellent in transparency and heat resistance, specifically, the formed article having a total light transmittance of 90% or more and a 10% weight loss temperature of 400° C. or more. The total light transmittance in the present specification and claims is a value measured in accordance with JIS-K-7361-1-1997 "Test Method of Total Light Transmittance of Plastics-Transparent Materials-Part 1: Single Beam Method".

Then, the β-pinene polymer according to the present invention and the formed article obtained using such a polymer are not particularly limited in their use, and can be used in various uses, similarly to conventional transparent resins. For example, it is possible to use them in optical sheets, optical discs, optical lenses, retardation films for liquid crystal displays, optical waveguides, diffusion plates, protective films for polarization plates, display front plates, automotive light covers, lens covers, meter covers and the like.

EXAMPLES

To further clarify the present invention, some example of the invention will be described. It is to be understood that the invention is not limited to the details of illustrated examples and the forgoing description, but may be embodied with various changes, modifications and improvements, which may occur to those skilled in the art without departing from the scope of the present invention.

In the following examples, the degree of reaction of β-pinene, the weight average molecular weight and number average molecular weight of the resulting polymer, the degree of hydrogenation, the total light transmittance, the glass transition temperature, the 10% weight loss temperature, the refractive index (nD), the specific gravity, the bending elastic modulus, the Abbe number, the photoelastic coefficient, the water absorption and the coefficient of linear expansion were determined as follows, respectively.

-Weight Average Molecular Weight and Number Average Molecular Weight-

The weight average molecular weight and number average molecular weight were determined from a value of a differential refractometer detector measured by gel permeation chromatography (GPC) according to a technique of size exclusion chromatography defined by JIS-K-0124-2002 "General Rule of High Performance Liquid Chromatography" and a calibration curve of standard polystyrene. As GPC equipment, there were used a PU-980 (product number) pump manufactured by JASCO Corporation and a 930-RI (product number) differential refractometer manufactured by the same company. As a column, there were used two Shodex (trade name, product number: GPC K-805L) columns manufactured by Showa Denko K.K connected in series. In the measurement, tetrahydrofuran was used as a solvent, and the measurement was made under the conditions of 40° C.

-Degree of Hydrogenation-

A $^1$H-NMR spectrum was obtained using deuterated chloroform as a solvent, taking tetramethylsilane (TMS) as 0 ppm, and using Gemini 2000 (product number) 400 MHz manufactured by Varian. The measurement was made at room temperature. The degree of hydrogenation was determined by a decrease in a peak at 4.0 to 6.0 ppm, which was caused by an unsaturated bond existing in a spectrum before the hydrogenation. At this time, the ratio (A/B) of an integral value A of a signal (a signal derived from the protons of an olefinic double bond) detected at δ=4.0 to 6.0 ppm in the $^1$H-NMR spectrum to an integral value B of a signal (a signal derived from the protons of a saturated hydrocarbon) detected at δ=0.5 to 2.5 ppm was taken as an olefin ratio (Q).

-Glass Transition Temperature-

The glass transition temperature was measured according to a technique defined by JIS-K-7121-1987 "Method for Measuring Transition Temperature of Plastics", and the intermediate point glass transition temperature ($T_{mg}$) therein was taken as the glass transition temperature. As a measuring device, there was used SSC-5200 (product number) manufactured by Seiko Instruments Inc.

-10% Weight Loss Temperature-

The 10% weight loss temperature was measured based on JIS-K-7120-1987 "Thermal Weight Measurement of Plastics". As a measuring device, there was used SSC-5200 (product number) manufactured by Seiko Instruments Inc.

-Total Light Transmittance-

The total light transmittance was measured in accordance with JIS-K-7361-1-1997 "Test Method of Total Light Transmittance of Plastics-Transparent Materials-Part 1: Single Beam Method". As a measuring device, there was used a haze meter HR-100 (product number) manufactured by Murakami Color Research Laboratory.

-Refractive Index (nD)-

The refractive index was measured under the conditions of 25° C. using RX-2000 (product number) manufactured by ATAGO CO., LTD.

-Specific Gravity-

The specific gravity was measured based on JIS-K-7112-1999, Method A.

-Bending Elastic Modulus and Bending Strength-

A test piece of each polymer was prepared, the bending elastic modulus at 23° C. was measured using such a test piece and an autograph (manufactured by SHIMAZU CORPORATION) based on JIS-K-7171. The maximum point stress was taken as the bending strength.

-Abbe Number-

The Abbe number was measured under the conditions of 25° C. using an Abbe refractometer DR-M2 (product number) manufactured by ATAGO Co., Ltd.

-Photoelastic Coefficient-

A 200 μm-thick film composed of each polymer was annealed at a temperature of (Tg of the polymer−20)° C. overnight, and then, tensile stress was applied in a longitudinal direction of the film at a temperature of (Tg+20)° C. A retardation at that time was measured with an ellipsometer M220 (manufactured by JASCO Corporation), and the photoelastic coefficient was calculated from the change in the retardation with respect to the stress.

-Water Absorption-

The water absorption was measured based on JIS-K-7209-2000, Method A.

-Coefficient of Linear Expansion-

A test piece of each polymer was prepared, and using such a test piece, the coefficient of linear expansion was measured based on JIS-K-7197. As a measuring device, there was used TMA4000SA (product number) manufactured by Bruker AXS K.K.

-Production and Evaluation of Polymer 1-

In a thoroughly dried glass flask equipped with a cock, 11.6 ml of dehydrated hexane (manufactured by Wako Pure Chemical Industries, Ltd.), 13.0 ml of dehydrated dichloromethane (manufactured by the same company), 2.3 ml of β-pinene (manufactured by the same company) and 0.05 ml (3.48 parts by weight based on 100 parts by weight of β-pinene) of m-diisopropylbenzene (manufactured by TOKYO CHEMICAL INDUSTRY CO., LTD.) were added under a nitrogen stream, and stirred to be uniformly dissolved. After cooling to −78° C., 1.18 ml of a hexane solution of $EtAlCl_2$ as a Lewis acid (manufacture by KANTO CHEMICAL CO., INC., concentration: 1.0 mol/L) was added to initiate polymerization.

Reaction proceeded in the reaction solution without gelation. After the reaction was conducted for 1 hour, 10 ml of methanol was added to the reaction solution to terminate the reaction. The reaction solution was reprecipitated by using methanol, and the precipitate was thoroughly dried, thereby obtaining 2.1 g of a β-pinene polymer (polymer 1) wholly soluble in tetrahydrofuran. The yield was 100%. The weight average molecular weight of the resulting polymer 1 was 204,300, and the glass transition temperature was 90° C.

-Production and Evaluation of Polymer 2-

Reaction was conducted in the same manner as in the case of the production of polymer 1 with the exception that the amount of m-diisopropenylbenzene was changed to 0.033 ml (2.32 parts by weight based on 100 parts by weight of β-pinene). The reaction proceeded without gelation. After the reaction was conducted for 1 hour, operations were performed in the same manner as in the case of polymer 1, thereby obtaining 2.0 g of a β-pinene polymer (polymer 2). The yield was 100%. The weight average molecular weight of the resulting polymer 2 was 90,600, and the glass transition temperature was 88° C.

-Production and Evaluation of Polymer 3-

Synthesis was performed in the same manner as in the case of the production of polymer 2 with the exception that the order of addition of β-pinene and the Lewis acid was changed. That is to say, 11.6 ml of dehydrated hexane, 13.0 ml of dehydrated dichloromethane and 1.18 ml of a hexane solution of $EtAlCl_2$ as a Lewis acid (concentration: 1.0 mol/L) were added in a thoroughly dried glass flask equipped with a cock under a nitrogen stream, and stirred to be uniformly dissolved. After cooling to −78° C., a mixture of 2.3 ml of β-pinene and 0.033 ml (2.32 parts by weight based on 100 parts by weight of β-pinene) of m-diisopropenylbenzene was added dropwise into the flask to initiate polymerization. The reaction proceeded without gelation. After the reaction was conducted for 1 hour, operations were performed in the same manner as in the case of polymer 2, thereby obtaining 2.1 g of a β-pinene polymer (polymer 3). The yield was 100%. The weight average molecular weight of the resulting polymer 3 was 114,000, and the glass transition temperature was 89° C.

-Production and Evaluation of Polymer 4 and Formed Article 1-

A pressure vessel equipped with a stirrer was prepared, and the inside thereof was sufficiently replaced with nitrogen. Then, sufficiently dehydrated hexane and 2.0 g of polymer 1 were put therein, followed by sufficient dissolution. Subsequently, 500 mg of a palladium/alumina supported catalyst (manufactured by Wako Pure Chemical Industries, Ltd., Pd: 5%) was added, and hydrogenation reaction was conducted under a hydrogen atmosphere of 10 kg/cm$^2$ at 90° C. for 7 hours. After such a reaction, the reaction solution was centrifuged to perform filtration, thereby removing the catalyst, and then, reprecipitated by using methanol. The precipitate was thoroughly dried, thereby obtaining 2.0 g of a hydrogenated product (polymer 4) of the β-pinene polymer (polymer 1). The degree of hydrogenation of the resulting polymer 4 was calculated by the $^1$H-NMR spectrum measurement. As a result, it was 99.95%, and the olefin ratio (Q) was 0.00003. Further, The weight average molecular weight of polymer 4 was 198,000, and the glass transition temperature was 130° C.

Further, the resulting polymer 4 was press molded under the conditions of a press temperature of 200° C. and a press pressure of 100 kg/cm$^2$ to obtain a 1 mm-thick sheet-like formed article (formed article 1). The total light transmittance of the resulting formed article 1 was 91.5%, and the 10% weight loss temperature was 460° C. The measurement results of the total light transmittance and the like for the resulting formed article 1 are shown in the following Table 1.

-Production and Evaluation of Polymer 5-

The inside of a thoroughly dried glass flask equipped with a cock was sufficiently replaced with nitrogen. Then, 44.1 ml of dehydrated n-hexane and 46.1 ml of dehydrated dichloromethane were added, and cooled to −78° C. Further, 0.15 ml of β-pinene purified by distillation and 0.052 ml of a hexane solution of m-dicumyl chloride as an initiator (concentration: 0.96 mol/L) were added, while stirring at −78° C. Furthermore, 1.89 ml of a hexane solution of $Et_2AlCl$ as a Lewis acid (concentration: 1.0 mol/L) was added, while being kept at −78° C. As a result, the color of the reaction solution gradually changed to orange. Immediately, 7.04 ml of β-pinene was added for 3.5 hours. As a result, the reaction solution gradually turned deep yellow, and the viscosity of the solution increased.

After addition of β-pinene was terminated, the reaction was conducted for 1 hour. Then, 4 ml of methanol was added to the reaction solution to terminate the reaction. An aqueous solution in which 5 g of citric acid was added to 100 ml of distilled water was added, followed by stirring for 5 minutes. A water layer was removed, and distilled water was added to carry out washing until a water layer was neutralized, thereby removing the aluminum compound. The resulting organic layer was reprecipitated in 1,000 ml of methanol, and then, the precipitate was thoroughly dried, thereby obtaining 6.8 g of a β-pinene polymer (polymer 5). The yield was 100%. The weight average molecular weight of the resulting polymer 5 was 97,000, the number average molecular weight was 40,000, and the glass transition temperature was 93° C.

-Production and Evaluation of Polymer 6-

The inside of a thoroughly dried glass flask equipped with a cock was sufficiently replaced with nitrogen. Then, 237 ml of dehydrated n-hexane, 159 ml of dehydrated dichloromethane and 0.7 ml of dehydrated diethyl ether as an electron donor were added, and cooled to −78° C. Subsequently, 9.3 ml of a hexane solution of $EtAlCl_2$ as a Lewis acid (concentration: 1.0 mol/L) was added, while stirring at −78° C. Further, 3.7 ml of a hexane solution of p-dicumyl chloride as an initiator (concentration: 0.1 mol/L) was added, while being kept at −78° C. As a result, the color of the reaction solution changed to reddish orange. Immediately, 70 ml of β-pinene purified by distillation was added to the reaction solution for 1 hour. As a result, the reaction solution gradually turned deep orange, and the viscosity of the solution increased.

After addition of β-pinene was terminated, the reaction was conducted for 1 hour. Then, 30 ml of methanol was added to the reaction solution to terminate the reaction. An aqueous solution in which 5 g of citric acid was added to 100 ml of distilled water was added, followed by stirring for 5 minutes. A water layer was removed, and distilled water was added to carry out washing until a water layer was neutralized, thereby removing the aluminum compound. The resulting organic layer was reprecipitated using 5,000 ml of a mixed solvent of methanol and acetone (methanol/acetone=50/50% by volume), and then, the precipitate was thoroughly dried, thereby obtaining 61.3 g of a β-pinene polymer (polymer 6). The yield was 100%. The weight average molecular weight of the resulting polymer 6 was 116,000, the number average molecular weight was 51,000, and the glass transition temperature was 95° C.

-Production and Evaluation of Polymer 7 and Formed Article 2-

Hydrogenation reaction to polymer 5 was conducted in the same manner as in the case of the production of polymer 4 with the exception that 6.0 g of polymer 5 was used in place of polymer 1, thereby obtaining 6.0 g of a hydrogenated product (polymer 7) of polymer 5. The degree of hydrogenation of the resulting polymer 7 was calculated by the $^1$H-NMR spectrum measurement. As a result, it was 99.98%, and the olefin ratio (Q) was 0.00001. Further, the weight average molecular weight of polymer 7 was 95,000, and the glass transition temperature was 130° C.

Further, the resulting polymer 7 was press molded under the conditions of a press temperature of 200° C. and a press pressure of 100 kg/cm$^2$ to obtain a 1 mm-thick sheet-like formed article (formed article 2). The total light transmittance of the resulting formed article 2 was 92%, the 10% weight loss temperature was 460° C., the specific gravity was 0.93, the bending strength was 65 MPa, the bending elastic modulus was 2500 MPa, and the water absorption was 0.1% or less. The measurement results of the total light transmittance and the like of formed article 2 are shown in the following Table 1.

-Production and Evaluation of Polymer 8 and Formed Article 3-

A pressure vessel equipped with a stirrer was prepared, and the inside thereof was sufficiently replaced with nitrogen. Then, 90 ml of sufficiently dehydrated cyclohexane and 30 g of polymer 6 described above were put therein, followed by sufficient dissolution. Subsequently, 30 g of a palladium/alumina supported catalyst (Pd: 5%, manufactured by N. E. Chemcat Corporation) was added, and hydrogenation reaction was conducted under a hydrogen atmosphere of 40 kgf/cm$^2$ at 100° C. for 6 hours. After such a reaction, 200 ml of cyclohexane was added to the reaction solution to dilute it, and then, the reaction solution was filtered through a 0.5 µm Teflon (registered trade mark) filter to separate and remove the catalyst. Thereafter, reprecipitation was performed in a mixed solvent of methanol and acetone (methanol/acetone=50/50% by volume), and the precipitate was thoroughly dried, thereby obtaining 29 g of a hydrogenated product (polymer 8) of the β-pinene polymer (polymer 6). The degree of hydrogenation of the resulting polymer 8 was calculated by the $^1$H-NMR spectrum measurement. As a result, it was 99.99%, and the olefin ratio (Q) was 0.00006. Further, the weight average molecular weight of polymer 8 was 112,000, the number average molecular weight was 50,800, and the glass transition temperature was 130° C.

Further, the resulting polymer 8 was press molded under the conditions of a press temperature of 200° C. and a press pressure of 100 kg/cm$^2$ to obtain a 1 mm-thick sheet-like formed article (formed article 3). For the resulting formed article 3, the total light transmittance was 92%, the 10% weight loss temperature was 437° C., the refractive index (nD) was 1.505, the specific gravity was 0.93, the bending strength was 72 MPa, the bending elastic modulus was 2600 MPa, the Abbe number was 61, the photoelastic coefficient was 6.90×10$^{-11}$ cm$^2$/dyn, the water absorption was 0.1% or less, and the coefficient of linear expansion was 6.5×10$^{-5}$ (1/K). The measurement results of the total light transmittance and the like for formed article 3 are shown in the following Table 1 and Table 2.

-Production and Evaluation of Polymer 9-

The inside of a thoroughly dried glass flask equipped with a cock was sufficiently replaced with nitrogen. Then, 45.0 ml of dehydrated methylcyclohexane, 45.0 ml of dehydrated dichloromethane and 0.16 ml of dehydrated diethyl ether as an electron donor were added, and cooled to −78° C. Subsequently, 1.92 ml of a hexane solution of EtAlCl$_2$ as a Lewis acid (concentration: 1.04 mol/L) was added, while stirring at −78° C. Further, 0.05 ml of a methylcyclohexane solution of m-dicumyl chloride as an initiator (concentration: 0.96 mol/L) was added, while being kept at −78° C. As a result, the color of the reaction solution changed to reddish orange. Immediately, a monomer solution obtained by mixing 6.28 ml of β-pinene purified by distillation, 0.67 ml of α-methylstyrene and 0.14 g (2.30 parts by weight based on 100 parts by weight of the group of monomers consisting of β-pinene and α-methylstyrene) of m-diisopropenylbenzene as a bifunctional vinyl compound was added to the reaction solution for 2 hours. As a result, the reaction solution gradually turned deep orange, and the viscosity of the solution increased.

After addition of the monomer solution was terminated, the reaction was conducted for 1 hour. Then, 4 ml of methanol was added to the polymerization solution to terminate the reaction. An aqueous solution in which 5 g of citric acid was added to 100 ml of distilled water was added, followed by stirring for 5 minutes. A water layer was removed, and distilled water was added to carry out washing until a water layer was neutralized, thereby removing the aluminum compound. The resulting organic layer was reprecipitated in 1500 ml of methanol, and then, a precipitate was thoroughly dried, thereby obtaining 7.28 g of polymer 9, a β-pinene polymer (a copolymer of β-pinene and α-methylstyrene). For the resulting polymer 9, the composition ratio was calculated by the $^1$H-NMR spectrum measurement. As a result, it was a copolymer composed of 10.9% by weight of α-methylstyrene and 89.1% by weight of β-pinene. The weight average molecular weight was 109,400, the number average molecular weight was 35,300, and the glass transition temperature was 98° C.

TABLE 1

|  | Total Light Transmittance [%] | 10% Weight Loss Temperature [° C.] | Specific Gravity | Bending Strength [MPa] | Bending Elastic Modulus [MPa] | Water Absorption [%] |
| --- | --- | --- | --- | --- | --- | --- |
| Formed Article 1 | 91.5 | 460 | — | — | — | — |
| Formed Article 2 | 92 | 460 | 0.93 | 65 | 2500 | 0.1 or less |
| Formed Article 3 | 92 | 437 | 0.93 | 72 | 2600 | 0.1 or less |

TABLE 2

| | Refractive Index (nD) | Abbe Number | Photoelastic Coefficient [cm²/dyn] | Coefficient of Linear Expansion [1/K] |
|---|---|---|---|---|
| Formed Article 3 | 1.505 | 61 | $6.90 \times 10^{-11}$ | $6.5 \times 10^{-5}$ |

As apparent from the results described in Table 1, it was observed that the formed articles obtained using the β-pinene polymers according to the present invention were excellent in transparency, heat resistance and strength, and light in weight.

Although the examples of the present invention have been described in detail, some comparative examples will be shown below in order to more clarify the advantages of the present invention.

-Production and Evaluation of Polymer 10-

Polymerization was performed in the same manner as in the case of polymer 1 with the exception that m-diisopropenylbenzene was not used. The reaction proceeded without gelation. After the reaction was conducted for 1 hour, the reaction solution was reprecipitated in methanol, and the precipitate obtained was thoroughly dried, thereby obtaining 2.0 g of a β-pinene polymer (polymer 10). The yield was 100%. The weight average molecular weight of the resulting polymer 10 was as small as 31,700.

-Production and Evaluation of Polymer 11-

Reaction was conducted in the same manner as in the case of the production of polymer 1 with the exception that the amount of m-diisopropenylbenzene was changed to 0.083 ml (5.81 parts by weight based on 100 parts by weight of β-pinene). A reaction solution gelled to be solidified. After the reaction was conducted for 1 hour, a polymerization solution was reprecipitated in methanol, and the precipitate obtained was thoroughly dried, thereby obtaining a β-pinene polymer (polymer 11). However, the resulting polymer 11 was insoluble in an organic solvent.

-Production and Evaluation of Polymer 12-

By a process described in non-patent document 2,2,6-di-t-butyl-4-methylpyridine was added, and β-pinene was polymerized by cationic polymerization. Specifically, polymerization was performed in the same manner as in the case of polymer 1 with the exceptions that the amount of β-pinene was changed to 0.58 ml, that m-diisopropenylbenzene was not used, and that 0.10 g of 2,6-di-t-butyl-4-methylpyridine was added, thereby obtaining an alicyclic hydrocarbon-based polymer (polymer 12). In non-patent document 2, it is described that a polymer (β-pinene polymer) having a number average molecular weight of 39,900 and a weight average molecular weight of 84,600 is obtained. However, it is known that the relative molecular weight varies depending on the kind of measurement solvent and column used, in the GPC measurement determined by polystyrene conversion, which is used for measurement of the molecular weight. The present inventors measured the number average molecular weight and weight average molecular weight of the resulting polymer 12. As a result, the number average molecular weight was 25,100, and the weight average molecular weight was 54,700.

-Production and Evaluation of Polymer 13 and Formed Article 4-

Hydrogenation reaction to polymer 4 was conducted in the same manner as in the case of the production of polymer 4 with the exception that 2.0 g of polymer 12 was used in place of polymer 1, thereby obtaining 1.95 g of a hydrogenated product (polymer 13) of polymer 4. The degree of hydrogenation of the resulting polymer 13 was calculated by the ¹H-NMR spectrum measurement. As a result, it was 99.95%, and the olefin ratio (Q) was 0.00003. Further, The weight average molecular weight of polymer 13 was 47,400, and the glass transition temperature was 128° C.

Further, the resulting polymer 13 was press molded under the conditions of a press temperature of 200° C. and a press pressure of 100 kg/cm² to obtain a 1 mm-thick sheet-like formed article (formed article 4). However, formed article 4 was brittle and broken when tried to be attached to a fixture for measurement of the bending strength.

-Production and Evaluation of Polymer 14-

Polymerization was performed in the same manner as in the case of polymer 10 with the exception that $BF_3$ (an ether complex, Aldrich) was used as a Lewis acid. The reaction proceeded without gelation. After the reaction was conducted for 1 hour, a polymerization solution was reprecipitated in methanol, and the precipitate obtained was thoroughly dried, thereby obtaining 0.32 g of a β-pinene polymer (polymer 14). The yield was 16%. The weight average molecular weight of the resulting polymer 14 was as very small as 5,800.

-Production and Evaluation of Polymer 15-

Hydrogenation reaction to polymer 14 was conducted in the same manner as in the case of polymer 4 with the exception that polymer 14 was used, thereby obtaining 0.32 g of a hydrogenated product (polymer 15) of polymer 14. The degree of hydrogenation of the resulting polymer 15 was calculated by the ¹H-NMR spectrum measurement. As a result, it was 99.95%. Further, the glass transition temperature of polymer 15 was 90° C. Furthermore, using the resulting polymer 15, press molding was tried under the conditions of a press temperature of 180° C. and a press pressure of 100 kg/cm². However, the formed article was broken when separated from a mold, and failed in obtaining a stable formed article.

-Production and Evaluation of Polymer 16-

Polymerization was performed in the same manner as in the case of polymer 5 with the exception that m-dicumyl chloride as an initiator was not used. Even after the reaction was conducted for 1 hour after termination of the addition of β-pinene, the viscosity of a solution did not increase. In the same manner as in the case of polymer 5, the reaction was stopped with methanol, the reaction solution was washed, an organic layer was reprecipitated in 1,000 ml of methanol, and then, the precipitate was thoroughly dried, thereby obtaining 1.3 g of a β-pinene polymer (polymer 16). The yield was 19%. The weight average molecular weight of the resulting polymer 16 was 13,600, and the number average molecular weight was 7,600.

What is claimed is:

1. A β-pinene polymer having a weight average molecular weight of 90,000 to 1,000,000 and a glass transition temperature of 80° C. or more, the β-pinene polymer being obtained by polymerizing β-pinene in the presence of a bifunctional vinyl compound in a quantitative proportion of 0.1 to 5.0 parts by weight based on 100 parts by weight of the total amount of monomer wherein (a) β-pinene is present in a proportion of at least 50% by weight, and (b) olefinic carbon-carbon double bonds are at least partially hydrogenated.

2. The β-pinene polymer according to claim 1, which is obtained by cationically polymerizing the β-pinene using a living cationic polymerization catalyst comprising a combination of an initiator and a Lewis acid.

3. The β-pinene polymer according to claim 1, which is obtained by copolymerizing the group of monomers consisting of the β-pinene and any one of a cationically polymerizable monomer, a radically polymerizable monomer and a coordination polymerizable monomer in the presence of a bifunctional vinyl compound.

4. The β-pinene polymer according to claim 1, which is obtained by cationically copolymerizing the group of monomers consisting of β-pinene and a cationically polymerizable monomer using a living cationic polymerization catalyst comprising a combination of an initiator and a Lewis acid.

5. The β-pinene polymer according to claim 1, wherein the ratio (A/B) of an integral value A of a signal detected at δ=4.0 to 6.0 ppm to an integral value B of a signal detected at δ=0.5 to 2.5 ppm, in a $^1$H-NMR spectrum which is measured using a deuterated chloroform solvent and in which the protons of tetramethylsilane are taken as 0 ppm, is from 0 to 0.003.

6. The β-pinene polymer according to claim 1, wherein the specific gravity is less than 1.0, and the 10% weight loss temperature is 400° C. or more.

7. A formed article comprising the β-pinene polymer according to claim 1 and having a total light transmittance of 90% or more and a 10% weight loss temperature of 400° C. or more.

8. A process for producing a β-pinene polymer, comprising the step of cationically polymerizing β-pinene or cationically copolymerizing the group of monomers consisting of β-pinene and a cationically polymerizable monomer using a Lewis acid catalyst in the presence of a bifunctional vinyl compound in a quantitative proportion of 0.1 to 5.0 parts by weight based on 100 parts by weight of the total amount of monomer to produce a β-pinene polymer having a weight average molecular weight of 90,000 to 1,000,000 and a glass transition temperature of 80° C. or more, wherein (a) β-pinene is present in a proportion of at least 50% by weight, and (b) olefinic carbon-carbon double bonds are at least partially hydrogenated.

9. The β-pinene polymer according to claim 1, wherein said bifunctional vinyl compound is m-diisopropenylbenzene.

10. The process for producing a β-pinene polymer according to claim 8, wherein said bifunctional vinyl compound is m-diisopropenylbenzene.

11. The β-pinene polymer according to claim 1, wherein said glass transition temperature is from 80° C. to 350° C.

12. The process for producing a β-pinene polymer according to claim 8, wherein said glass transition temperature is from 80° C. to 350° C.

13. The β-pinene polymer according to claim 1, wherein the β-pinene is present in a proportion of at least 70% by weight.

14. The β-pinene polymer according to claim 1, wherein at least 90% of the olefinic carbon-carbon double bonds are hydrogenated.

15. The process for producing a β-pinene polymer according to claim 8, wherein the β-pinene is present in a proportion of at least 70% by weight.

16. The process for producing a β-pinene polymer according to claim 8, wherein at least 90% more of the olefinic carbon-carbon double bonds are hydrogenated.

* * * * *